Dec. 2, 1924.

E. H. FISHER

TONGS

Filed July 10, 1924

1,517,776

WITNESSES

INVENTOR
Edwin H. Fisher
by Winter, Brown & Critchlow
his attorneys

Patented Dec. 2, 1924.

1,517,776

UNITED STATES PATENT OFFICE.

EDWIN H. FISHER, OF PITTSBURGH, PENNSYLVANIA, ASSIGNOR TO SCIENTIFIC MATERIALS COMPANY, OF PITTSBURGH, PENNSYLVANIA, A CORPORATION OF PENNSYLVANIA.

TONGS.

Application filed July 10, 1924. Serial No. 725,145.

*To all whom it may concern:*

Be it known that I, EDWIN H. FISHER, a citizen of the United States, and a resident of Pittsburgh, in the county of Allegheny and State of Pennsylvania, have invented a new and useful Improvement in Tongs, of which the following is a specification.

This invention relates to lifting tongs for hot objects.

The objects of the invention are to provide a pair of tongs capable of being readily handled with one hand, and adapted to positively engage and hold the rim of a hot receptacle. An object of the invention is to provide the tongs in a form that will grip both the upper edge and the undersurface of hot receptacles having tapered side walls. Another object is to engage the rim of such receptacles on its upper edge at three points, so that the contents may be poured out, using the tongs as a handle without danger of dropping the dish. Another object is to provide tongs that will readily engage a dish having an outwardly extending bead or flange without danger of the dish slipping out. Another object is to provide a positive overlapping retaining member at the fork of the tongs, and means to keep that member constantly in operative position regardless of the extent to which the tongs may be opened. And finally a specific object of the invention is to provide tongs for lifting chemical laboratory evaporation dishes of a simple, efficient, and positive acting construction.

Figure 1:
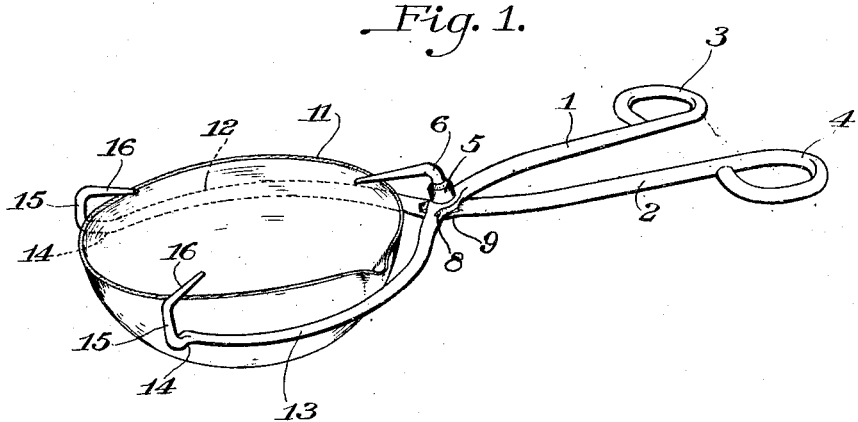
Figure 2:
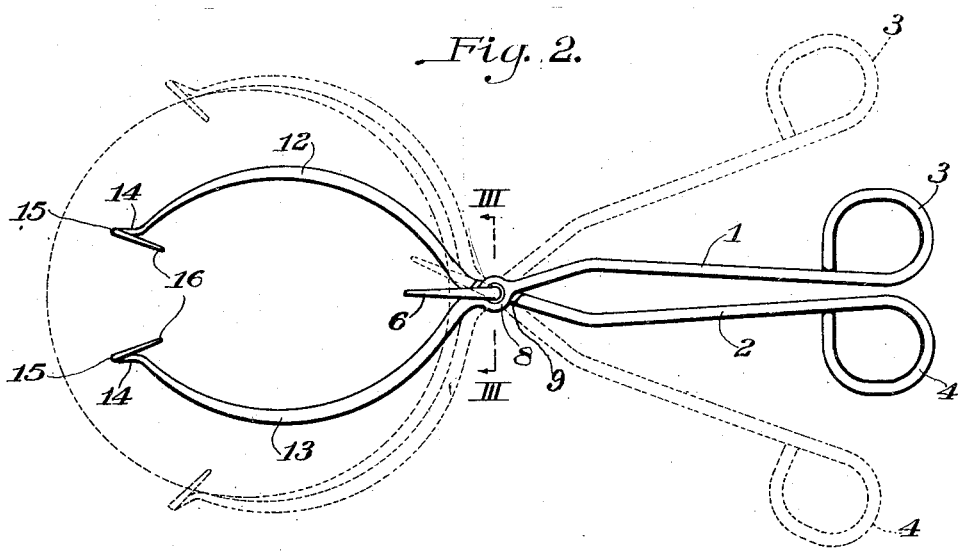
Figure 3:
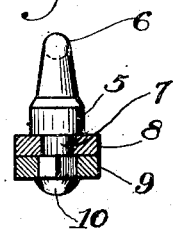

Referring to the drawings, Fig. 1 is a perspective view of an embodiment of this invention showing its application to evaporation dishes; Fig. 2 is a plan view of the tongs, shown in open and closed position; and Fig. 3 is a section through the tongs at the joining rivets, on line III—III of Fig. 2.

In chemical laboratories small porcelain dishes of rounded form, and of various sizes, such as that illustrated in Fig. 1, are ordinarily used for evaporating fluids, and analogous uses, the dishes in use being positioned over a Bunsen burner upon a suitable frame. When the heating operation is completed, or at some intermediate stage when it is desired to remove the dish, some instrumentality has to be used to protect the hands, since the dishes are very hot. Owing to the peculiar shape of these dishes they are not easily handled by any ordinary tongs, or even by the hands of the operator with gloves or other protecting covering.

I have designed tongs particularly designed to handle these objects, although they may be used to lift other articles having edge flanges or tapered walls.

These tongs consist of two pivotally connected members 1 and 2, having eyes 3 and 4 at their respective ends for engagement of a finger and thumb of the operator, and pivotally connected at their middle portions by a pin, which comprises an enlarged body portion 5, from which there is a tapered extension 6, bent over parallel to the plane of the tongs to form an extension or retaining member as illustrated in Fig. 1. In the other direction beyond the enlarged body member 5 the pin has a cylindrical extension 7, which is adapted to pass through a circular opening in an enlarged flattened portion 8 of the upper member 1, and through an aligned square opening in a corresponding flattened portion 9 of the lower tong member 2. When the tongs are assembled and the pin passed through the opening in the circular portion 8 and the square opening in the flattened portion 9 of the other tong member, the end of the pin is beaten down to form a rivet-like head 10. This results in upsetting that portion of the pin extending through the square hole in the portion 9, and consequently causing the pin and the head 10 to engage the portion 9 so as to prevent relative movement thereof. On the other hand the circular portion of the pin 7 extending through the opening in the portion 8 permits that member of the tongs to rotate with reference to the pin. As a result of this construction the extension 6 has a fixed forwardly pointing direction with reference to the tong member 2 and therefore is constantly positioned to engage the edge of an evaporation dish 11 as illustrated in Fig. 1.

Beyond the point of connection the tongs are bent outward to form curved forward extension jaw members 12 and 13, which near their ends have outwardly bent portions 14, then upwardly bent portions 15, and horizontally inwardly extending terminal portions 16.

This bow or outwardly extending portion at each end of the tong members provides room for any bead or flange that may be formed on the rim of the cup, and still permits the jaws 12 and 13 to grip the walls of the cup directly.

Since evaporation dishes of the form illustrated are oval in cross section the jaws tend to slip downward thereon and consequently to bring the three extensions 6, 16, 16, down onto the edge of the dish and result in a secure gripping thereof, which is increased by pressure of the operator's hand. Thus such dishes may be securely held, and may be emptied without danger of dropping or slipping.

The elliptical shape of the jaws 12 and 13 give a maximum capacity to the tongs. When widely extended as shown in the dotted lines of Fig. 2 they will grip the larger size of evaporation dishes commonly known as No. 5 and when closed as shown in full lines in that figure they will hold the smallest or No. 0 of such dishes.

The tongs comprise only three pieces, which may be assembled with a single operation. They are positive in their gripping action, will take a wide range of sizes of dishes, and have been found to very efficiently fill a long existing need in laboratory work.

I claim:

1. Tongs for engaging the edges of open receptacles comprising jaw members adapted to engage the side walls of the receptacles and a plurality of projections adapted to extend over and seat upon the upper edge of the receptacle.

2. Tongs for lifting evaporation dishes comprising curved jaw members having terminal inwardly extending hooks adapted to seat upon the edge of the dish, and a hook member extending from the pivotal connecting point of the tongs inwardly and adapted to seat upon the edge of the cup.

3. The combination with lifting tongs adapted to engage evaporation dishes and having terminal inwardly extending projections adapted to extend over and seat upon the edge of the dish being held, of a member extending through the tong members and forming a pivotal connection therebetween, the said member having one end riveted into a square opening in one of the tong members, and an intermediate circular portion passing through a circular opening in the other member of the tongs, the opposite end of the connecting member being turned over and positioned to form a hook member for engaging the upper edge of the dish to be lifted.

In testimony whereof, I sign my name.

EDWIN H. FISHER.

Witnesses:
C. F. BENNEY,
WM. J. MAHER.